(12) United States Patent
Benayoun et al.

(10) Patent No.: US 7,304,941 B2
(45) Date of Patent: Dec. 4, 2007

(54) SWITCHOVER SYSTEM AND METHOD IN A DATA PACKET SWITCHING NETWORK

(75) Inventors: Alain Benayoun, Cagnes sur Mer (FR); Patrick Michel, La Gaude (FR); Gilles Toubol, Villeneuveloubet (FR)

(73) Assignee: International Business Machines Corporation, Armonk, NY (US)

( * ) Notice: Subject to any disclaimer, the term of this patent is extended or adjusted under 35 U.S.C. 154(b) by 972 days.

(21) Appl. No.: 10/412,953

(22) Filed: Apr. 11, 2003

(65) Prior Publication Data

US 2003/0227920 A1    Dec. 11, 2003

(30) Foreign Application Priority Data

Apr. 11, 2002    (EP) .................................. 02368038

(51) Int. Cl.
*H04J 3/14*    (2006.01)
*H04L 12/28*    (2006.01)

(52) U.S. Cl. ........................ 370/218; 370/220; 370/412
(58) Field of Classification Search ...................... None
See application file for complete search history.

(56) References Cited

U.S. PATENT DOCUMENTS

| 5,790,608 | A | 8/1998 | Benayoun et al. | |
|---|---|---|---|---|
| 5,903,544 | A * | 5/1999 | Sakamoto et al. | 370/218 |
| 6,426,953 | B1 | 7/2002 | Benayoun et al. | |
| 6,499,061 | B1 | 12/2002 | Benayoun et al. | |
| 6,819,675 | B2 | 11/2004 | Benayoun et al. | |
| 6,910,148 | B1 * | 6/2005 | Ho et al. | 714/4 |
| 7,075,888 | B1 * | 7/2006 | Kopp et al. | 370/218 |
| 2002/0021694 | A1 | 2/2002 | Benayoun et al. | |
| 2002/0089981 | A1 | 7/2002 | Benayoun et al. | |
| 2002/0110130 | A1 | 8/2002 | Benayoun et al. | |
| 2002/0146033 | A1 | 10/2002 | Benayoun et al. | |
| 2002/0146034 | A1 | 10/2002 | Benayoun et al. | |
| 2002/0191611 | A1 | 12/2002 | Benayoun et al. | |
| 2003/0076824 | A1 | 4/2003 | Benayoun et al. | |
| 2003/0117949 | A1 * | 6/2003 | Moller et al. | 370/219 |
| 2003/0133447 | A1 | 7/2003 | Benayoun et al. | |
| 2003/0227920 | A1 | 12/2003 | Benayoun et al. | |
| 2004/0264457 | A1 | 12/2004 | Benayoun et al. | |
| 2004/0266487 | A1 | 12/2004 | Hou et al. | |

* cited by examiner

*Primary Examiner*—Chi Pham
*Assistant Examiner*—Soon D. Hyun
(74) *Attorney, Agent, or Firm*—Yuanmin Cai; Lisa U. Jaklitsch

(57)    ABSTRACT

A switchover system and method is described. The invention preferably operates in a data packet switching system for transmitting through a switching arrangement data packets that comprise at least a data packet identifier. The switching arrangement comprises at least an active switch card associated to a backup switch card. And the active switch card and the backup switch card receive simultaneously at least a data packet and transmit it to a network adapter device. The switchover system comprises active and backup means for respectively storing at an active and backup data packet address the transmitted at least data packet. It also comprises switchover detecting means coupled to the active and backup storing means for detecting a switchover event, and control means coupled to the active and backup storing means and to the switchover detecting means for setting the backup storing means when a switchover event is detected.

8 Claims, 4 Drawing Sheets

SWITCHOVER SYSTEM AND METHOD IN A DATA PACKET SWITCHING NETWORK

TECHNICAL FIELD

The present invention relates to the transmission of data packets between Local Area Networks (LAN) interconnected by a switch engine and relates in particular to a system having means for processing the data packets during switchover.

BACKGROUND ART

Local Area Networks (LAN) such as Ethernet or token-ring networks, are generally interconnected through hubs. The hub is a system made of LAN adapters that communicate together through a switch card containing a switch engine. Such a switch engine can be either a shared memory switch or a crossbar switch.

The shared memory switch is a device wherein the data packets received by the input ports are stored into a memory at address locations determined by queues containing the packet destination addresses; the packets to be transmitted on the output ports as the destination addresses are dequeued.

Although such a switch enables the transfer of data packets it may present a bottleneck due to the hardware requirement of the many output ports, and may stop the data packet transfer from one adapter to another one due to hardware failure. In this particular case all data packets stored in the switch memory will be lost. This particular failure will have an impact on data transfer and on customer applications at the end of the adapter.

Any hardware failure on any switch system is damageable on the data packet transfer, and one of the solutions to prevent any hardware failure is to duplicate the switch system.

This solution consists of having duplicated synchronized switch cards, where one switch is active and the other one is backup. Both switches operate in parallel meaning that they receive/transmit the same data packets from/to the LAN adapters and receive the same commands issued from a Control Point of the switching system. When the active switch receives a switchover command from the Control Point, the active switch stops transferring data to the adapter. At the same time the backup switch receiving the same command becomes the active switch for all the attached adapters and takes over the data transfer. The major problem of those existing active/backup switches configurations is the loss or the duplication of data packets during the switchover operation, because the two switches are not in reality fully data packet synchronized.

Therefore there is a need for a switchover system that avoids loss or duplication of data packets during the switchover process.

SUMMARY OF THE INVENTION

Accordingly, the main object of the invention is to provide a packet loss less switchover system having a mechanism to process the data transfer switching from one switch to another without losing or duplicating any data packet.

Another object of the invention is to provide a switchover system that is fully integrated with the network adapter device.

Accordingly, the invention provides a switchover system and method as claim in the independent claims 1 and 7.

Preferably, the invention operates in a data packet switching system for transmitting data packets comprising at least a data packet identifier, through a switching arrangement comprising at least an active switch card associated to a backup switch card. The active switch card and the backup switch card receive simultaneously at least a data packet and transmit it to a network adapter device. The switchover system of the invention comprises:

active and backup means for respectively storing at an active and backup data packet address the transmitted at least data packet;

switchover detecting means coupled to the active and backup storing means for detecting a switchover event; and control means coupled to the active and backup storing means and to the switchover detecting means for setting the backup storing means when a switchover event is detected.

Various details of implementation are illustrated in the dependent claims.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
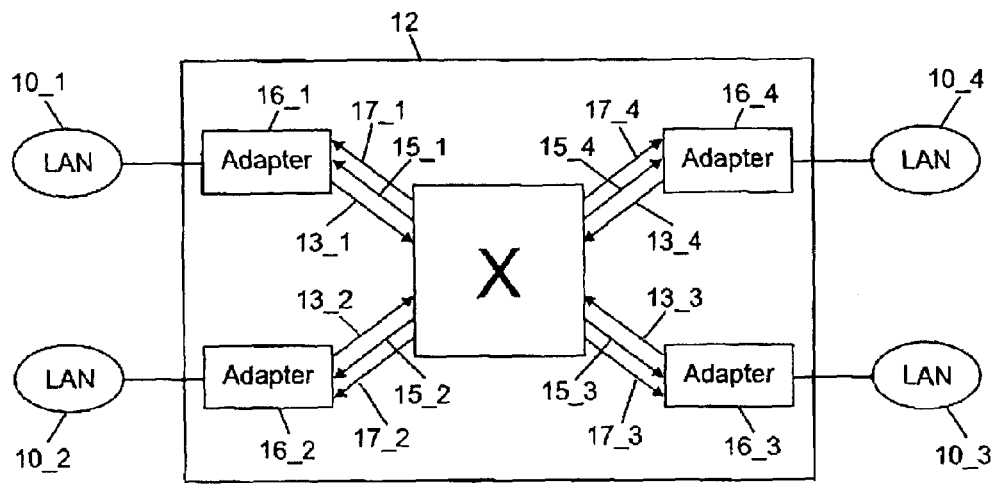
FIG. 1 is a block diagram of a switching data transmission system to operate the invention.

The invention is preferably implemented in a data transmission environment as illustrated on FIG. 1. For sake of simplicity, the environment is made of four Local Area Networks (LAN) 10_1, 10_2, 10_3, and 10_4 but it could be extended to a plurality of LANs and as such a LAN is also denoted 10_i in the description. LANs 10-i are interconnected together by a hub 12, and may be of the type ATM, Ethernet, or token-ring. Each LAN is connected to a switching system 14 within the hub 12 by means of a respective adapter 16_1 for LAN 10_1, adapter 16_2 for LAN 10_2, adapter 16_3 for LAN 10_3 and adapter 16_4 for LAN 10_4. Each adapter (also denoted 16_i) sends data packets by means of a data bus-in (bus-in 13_1 to bus-in 13_4) connected to input ports of the switching system 14. Each adapter also receives data packets by means of an active data bus-out and of a backup data bus-out (active bus-out 15_1 to active bus-out 15_4 and backup bus-out 17_1 to backup bus-out 17_4) connected to output ports of the switching system 14. Then, a data bus-in 13_i carries data packets from the respective adapter 16_i to switching system 14 and both data bus-out (15_i, 17_i) carry data packets from switching system 14 to the adapter 16_i. Details of the switching operation are omitted from the discussion and the reader may refer to the various and copious literature to learn about it.

Figure 2:
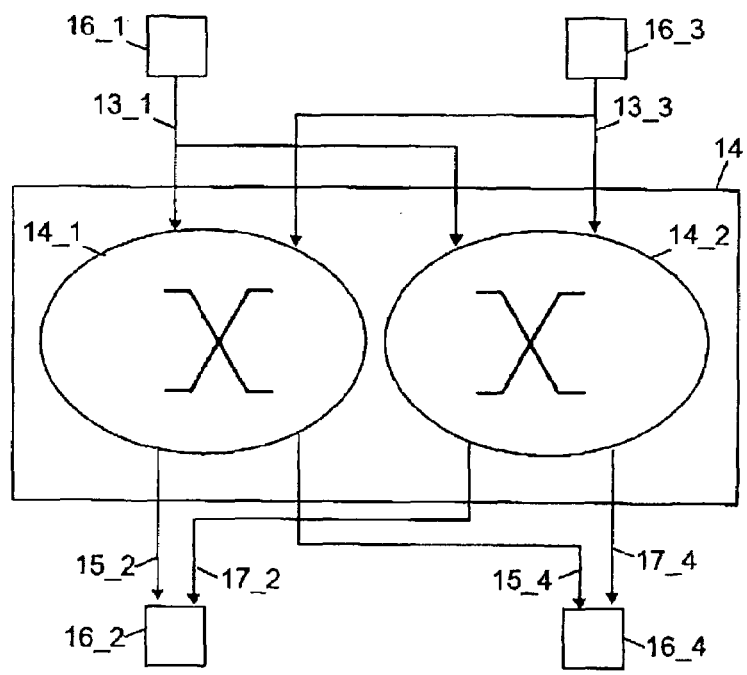
FIG. 2 is a schematic block diagram of the data packets flow structure for the switching system of FIG. 1.

Referring now to FIG. 2, a data packets flow structure within a hub in a half duplex communication is described. The switching system 14 is made of two distinct switch cards 14_1 and 14_2. Again for the ease of description, let's assume that switch card 14_1 is the active switch and switch card 14_2 is the backup switch. Data bus-in 13_1 of adapter 16_1 is connected to the respective input ports of switch cards 14_1 and 14_2. Each switch card communicates with each adapter through a single active data bus-but and a single backup data bus-out. Then for example active data bus-out 15_2 attached to adapter 16_2 is connected to output ports of active switch card 14_1 and backup data bus-out 17_2 attached to adapter 16_2 is connected to output ports of backup switch card 14_2.

Figure 3:
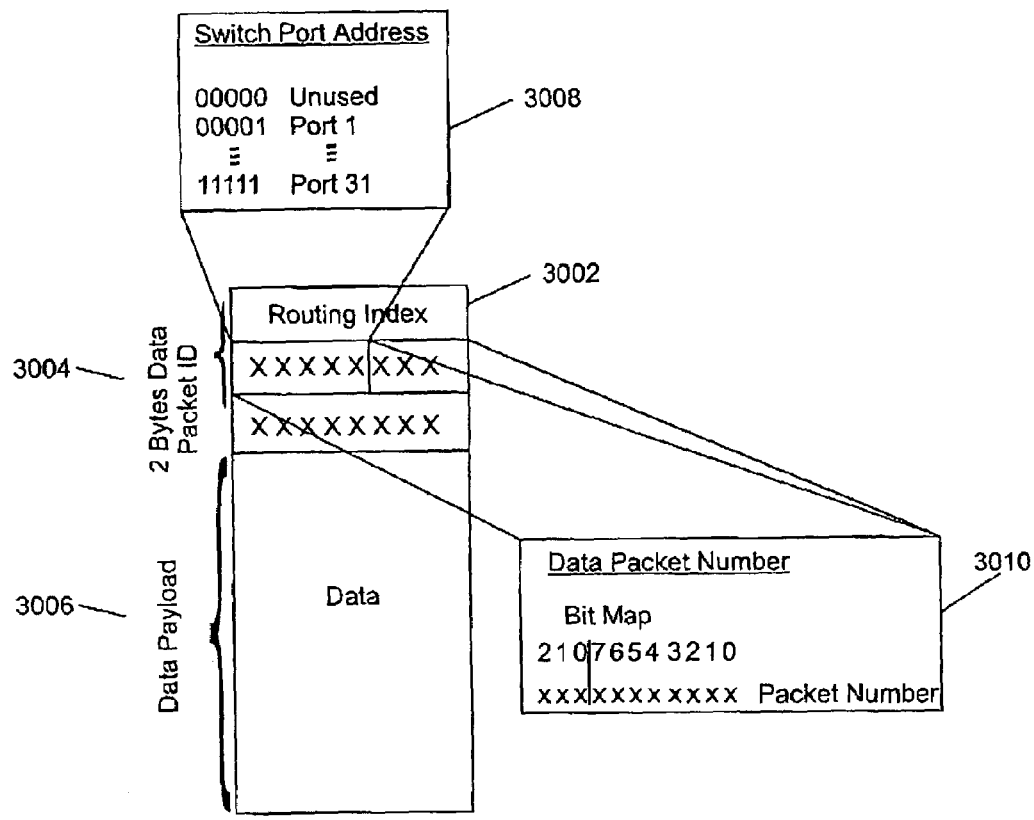
FIG. 3 illustrates a data packet format.

The system of the present invention takes advantage of a data packet having a format description as it is shown on FIG. 3. A data packet is made of a routing index 3002, a data packet identifier (ID) 3004 and a data payload 3006. The data packet ID is a 2-byte data packet made of a switch port address 3008 to identify the physical port number of the emitting adapter (for data packet reception) and a data packet number 3010. A different data packet number is attributed to each data packet to uniquely identify it to allow the retrieving of the data packets during the switchover process. As it will be explained later, the data packet ID will be used by the destinating adapter for switchover re-synchronisation.

Figure 4:
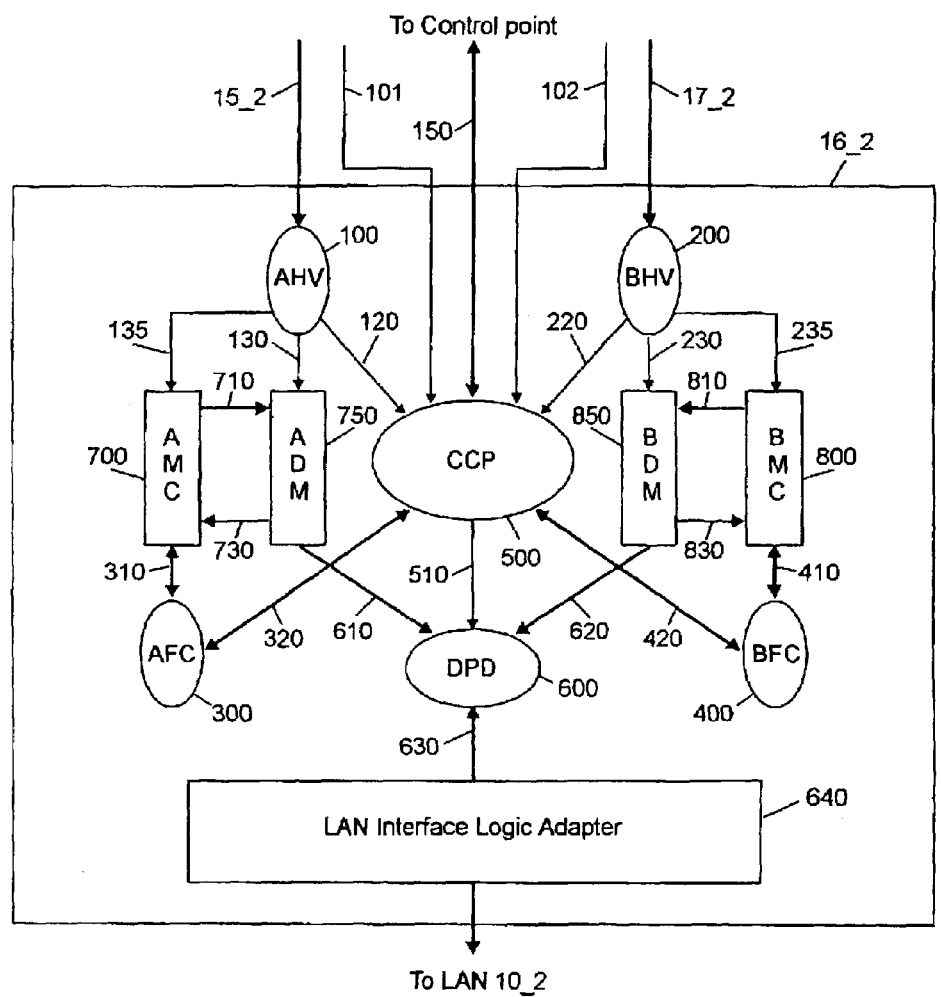
FIG. 4 shows schematically a preferred embodiment of the present invention.

Referring now to FIG. 4, the system of the invention is described as part of adapter 16_2 which receives data packets from adapter 16_1 on the active data bus-out 15_2 and on the backup data bus-out 17_2. It is to be easily understood that adapter 16_2 is taken only as example and that the system of the invention is implemented within each adapter of the hub. In the preferred embodiment, the system is mainly composed of:

a Central Control Processing block 500 to which are coupled:
 a Data Packet Dispatcher 600;
 an Active Header Validation block 100 and a Backup Header Validation block 200;
 an Active Flow Control block 300 and a Backup Flow Control block 400;
an Active Memory Controller 700 coupled to an Active Data Memory block 750;
a Backup Memory Controller 800 coupled to a Backup Data Memory block 850.

The structure and operating of the different blocks are now described.

Central Control Processing (CCP 500): The Central Control Processing block mainly performs the following tasks:
a) Interfacing the Control Point,
b) Authorising the switch data bus,
c) Validating the switchover detection,
d) Controlling and validating data packet recognition.

To detail more each task:

a) CCP interfaces the Control Point card through a control bus 150. This latter carries control information for retrieving data information or taking switchover decision.

b) CCP controls the data packet dispatcher block 600 using a switch control signal 510. This latter controls the direction of the data packet from either the active switch or the backup switch.

c) An active and a backup switchover signals 101 and 102 issued respectively from the active switch card 14_1 and the backup switch card 14_2 are fed to the CCP. According to the state of these control signals the CCP 500 initiates the switchover function.

d) CCP also receives an active error detection signal 120 from the Active Header Validation block 100 and a backup error detection signal 220 from the Backup Header Validation block 200. These control signals report to the CCP a receive detection problem or a data packet reception error. Finally, the CCP communicates with either the Active Flow Control block 300 through active flow bus 320 or with the Backup Flow Control block 400 through backup flow bus 420.

Data Packet Dispatcher (DPD 600): The Data Packet Dispatcher block 600 is a 2-to-1 multiplexer. One input is connected to the Active Data Memory 750 through an active dispatcher data bus 610. The other input is connected to the Backup Data Memory 850 through a backup dispatcher data bus 620. The output of DPD is connected to the LAN interface logic adapter 640 through an outgoing data bus 630. When the CCP activates the switch control signal 510, the DPD connects the outgoing data bus 630 to either the active dispatcher data bus 610 or to the backup dispatcher data bus 620 depending on the state of switch control signal 510.

Active and Backup Header Validation (AHV 100 and BHV 200):

For the active side, the AHV block 100 receives data packets from active switch card 14_1 through active data bus-out 15_2. In case of an error detection, an active error detection signal 120 is sent to the CCP. AHV also stores valid data packets (i.e. data packet where no error is detected) into Active Data Memory block 750 through active data bus 130.

For the backup side, the Backup Header Validation block 200 receives data packets from switch card 14_2 through data bus-out 17_2. In case of error detection, a backup error detection signal 220 is sent to the CCP. BHV also stores valid data packets into Backup Data Memory block 850 through backup data bus 230.

Active and Backup Memory Controllers (AMC 700 and BMC 800):

For the active side, the AMC 700 controls the enqueueing of data packets into Active Data Memory block 750 using an active write data packet bus 710 and controls the de-queueing of data packets from Active Data Memory block 750 using an active read data packet bus 730. In addition AMC receives flow control information from the Active Flow Control block 300 onto active memory control bus 310.

For the backup side, BMC 800 controls the enqueueing of data packets into Backup Data Memory block 850 using a backup write data packet bus 810 and controls the de-queueing of data packets from Backup Data Memory block 850 using a backup read data packet bus 830. In addition, BMC receives flow control information from the Backup Flow Control block 400 onto backup memory control bus 410.

Active and Backup Data Memory (ADM 750 and BDM 850):

For the active side, ADM 750 receives valid data packets from the Active Header Validation block 100 onto active data bus 130 and transmits these data packets to the Data Packet Dispatcher block 600 onto active dispatcher data bus 610. These two operations are supervised by the Active Memory Controller 700 which interfaces the Active Data Memory block 750 through the two already mentioned busses: the active write data packet bus 710 which carries the data packet ID for a write operation and the active read data packet bus 730 which carries the data packet ID for a read operation.

For the backup side, BDM 850 receives valid data packets from the Backup Header Validation block 200 onto backup data bus 230 and transmits these data packets to the Data Packet Dispatcher block 600 onto backup dispatcher data bus 620. These two operations are supervised by the Backup Memory Controller 800 which interfaces the Backup Data Memory block 850 through the two already mentioned busses: the backup write data packet bus 810 which carries the data packet ID for a write operation and the backup read data packet bus 830 which carries the data packet ID for a read operation.

Active and Backup Flow Control (AFC 300 and BFC 400)

For the active side, the AFC 300 exchanges control information with the Central Control Processing block 500 through active flow bus 320 and supervises the Active Memory Controller 700 through active memory control bus 310.

For the backup side, the BFC 400 exchanges control information with the Central Control Processing block 500 through backup flow bus 420 and supervises the Backup Memory Controller 800 through backup memory control bus 410.

The principle of operation of the system of the invention is now described as previously explained with adapter 16_1 transmitting a data packet to adapter 16_2. Adapter 16_1 first builds a data packet as defined in FIG. 3, and the formatted data packet is send to both switch cards (14_1, 14_2) onto data bus-in 13_1. Next, the data packet is routed by each switch card using the routing index information and received by the destinating adapter 16_2 on data bus-out 15_2 from switch card 14_1 and on data bus-out 17_2 from switch card 14_2.

It should be noted that despite the two switch cards are totally synchronous, the two data packets may be received by the adapter 16_2 with a slight delay but with no impact on the switchover process.

The following process is then repeated for both the active side and the backup side until a switchover request is detected by Central Control Processing block 500.

The data packet is analysed by the Active and Backup Header Validation blocks (100, 200) which perform the following tasks:

putting the data packet onto active/backup data bus (130, 230) of Active/Backup Data Memory blocks (750, 850) respectively; and sending the data packet ID to the Active and Backup Memory Controllers (700, 800) respectively through active ID bus 135 and backup ID bus 235 to perform a write operation.

The Active and Backup Memory Controllers (700, 800) take a write address from their own free buffer list. The active data packet is stored into the Active Data Memory 750 through active data bus 130 and active write data packet bus 710. Respectively, the backup data packet is also stored into the Backup Data Memory 850 through backup data bus 230 and backup write data packet bus 810. At the end of the write operation, the write address of the active data packet is en-queued into an output buffer list of the Active Data Memory along with the data packet ID.

The read memory operation is managed by the Memory Controllers (700, 800). The read address generated onto active and backup read data packet busses (730, 830) respectively is de-queued from an output buffer list. The active data packet is read from Active Data Memory 750 and sent to the Data Packet Dispatcher 600 through active dispatcher data bus 610. Similarly, the backup data packet is read from Backup Data Memory 850 and sent to the Data Packet Dispatcher 600 through backup dispatcher data bus 620. At the end of the read operation, Memory Controllers (700, 800) send the data packet ID to the Active/Backup Flow Control blocks (300, 400) through active/backup memory control busses (310, 410) respectively. This information is required in case of a switchover as described later.

Until a switchover request is received, the switch control signal 510 sets the Data Packet Dispatcher 600 to the active side. Therefore the outgoing data bus 630 is connected to the active dispatcher data bus 610 and the data packet is sent to a LAN interface logic adapter 640.

When a switchover request is detected by the Central Control Processing block 500, the following process takes place for both the active side and the backup side. It is to be noted that a switchover request may occurred by three different events:

1. when the Active Header Validation block 100 detects an error; or
2. when the active switch module 14_1 activates the switchover signal 101; or
3. when a switchover command is sent by the Control Point card through control bus 150.

When the Central Control Processing block 500 detects one of these switchover requests, the Active Flow Control block 300 is searched through active flow bus 320 to retrieve the last valid active data packet ID that has been stored into the Active Memory Controller 700.

The last enqueued valid active data packet ID is then dequeued from the output buffer list and stored into a comparator for later processing. The last enqueued valid active data packet ID is also transmitted to the Central Control Processing block 500 through active flow bus 320.

And the Central Control Processing block send it to the Backup Flow Control block 400 through backup flow bus 420.

The Backup Flow Control block 400 then searches for the corresponding last enqueued valid backup data packet ID into the output buffer list of Backup Memory Controller block 800. It should be noted that during this search period, the Active Memory Controller 700 still dequeues a data packet from the Active Data Memory 750 and sends it to the LAN interface logic adapter 640 through active dispatcher data bus 610 and outgoing data bus 630.

When the last enqueued valid backup data packet ID is found, Backup Memory Controller 800 increments its current dequeue pointer up to the address where the last enqueued valid backup data packet ID is found and stops the backup dequeueing process. Then Backup Flow Control block 400 informs the CCP through active flow bus 420 that it is ready to take over the data packet transfer.

Before switching the Data Packet Dispatcher 600 from the active side to the backup side, the CCP waits for a synchronisation signal from the active side. The synchronization signal is issued from the Active Flow Control block 300 when comparison operation is successful. As described earlier, at the end of a read operation, the Active Memory Controller 700 sends the current active data packet ID to the Active Flow Control block 300. This current data packet ID is compared to the last enqueued valid active data packet ID. When the comparison is successful, a synchronisation signal is send to the CCP. The latter then takes the following two actions:

1. Activating the switch control signal 510 to switch the Data Packet Dispatcher 600. The output bus 630 is then connected to the backup dispatcher data bus 620; and
2. Informing the Backup Flow Control block 400 to become the active side. The dequeuing process is then re-activated on the backup side.

And data packets are transmitted from Backup Data Memory 850 to the LAN interface logic adapter 640 until a new switchover request occurs.

The invention claimed is:

1. In a data packet switching system for transmitting data packets comprising at least a data packet identifier, through a switching arrangement comprising at least an active switch card associated to a backup switch card for simultaneously receiving at least a data packet and for transmitting said at least data packet from the active switch card and from the backup switch card to a network adapter device, a switchover system comprising:

active and backup storing means for respectively storing at an active and backup data packet address said transmitted at least data packet;

switchover detecting means coupled to the active and backup storing means for detecting a switchover event; and control means coupled to the active and backup storing means and to the switchover detecting means for setting the backup storing means when the switchover event is detected, wherein the active and backup storing means further comprises active and backup enqueuing means for respectively enqueuing said at least data packet identifier along with the active and backup data packet address, and the switchover detecting means further comprises means for retrieving the active one of said at least data packet identifier when the switchover event is detected.

2. The switchover system of claim 1 wherein the control means further comprises means for retrieving the backup one of said at least data packet identifier when the active one is retrieved.

3. A network adapter device comprising the switchover system of claim 2.

4. The network adapter device of claim 3 further comprising:

means for receiving a plurality of data packets from a network; and means for transmitting the plurality of data packets received from the network to the switching arrangement.

5. The network adapter device of claim 4 wherein the receiving means further comprising means for assigning a unique data packet identifier to each data packet of the plurality of data packets.

6. In a data packet switching system for processing a plurality of data packets through a switching arrangement, each data packet comprising at least a data packet identifier, the switching arrangement comprising at least an active switch card associated to a backup switch card for simultaneously receiving the plurality of data packets and for simultaneously transmitting the plurality of data packets from the active switch card and from the backup switch card to a network adapter device, a switchover method operating within the network adapter device comprising the steps of:

a. storing each incoming data packet at an active and a backup data packet address of an active and a backup memory respectively;

b. enqueuing into an active and a backup input queue respectively each at least data packet identifier along with the corresponding active and backup data packet address;

c. outputting each stored data packet from the active memory when no switchover event is detected;

d. when a switchover event is detected, retrieving from the active input queue the last data packet identifier validly enqueued;

e. searching for the corresponding last data packet identifier validly enqueued into the backup input queue;

f. enabling the outputting of the incoming data packets from the backup memory.

7. The method of claim 6 further comprising the step c. of storing the at least data packet identifier of each outputted data packet into a comparator.

8. The method of claim 7 further comprising the step e. of comparing the retrieved last data packet identifier validly enqueued into the active queue with the content of the comparator, and processing step f. when the comparator is successful.

* * * * *